United States Patent [19]

Morita et al.

[11] Patent Number: 5,274,742
[45] Date of Patent: Dec. 28, 1993

[54] COMBINATION PROBLEM SOLVING METHOD AND APPARATUS

[75] Inventors: Toyohisa Morita, Kawasaki; Makoto Kato, Yokohama; Shinichiro Miyaoka, Kawasaki, all of Japan

[73] Assignee: Hitachi, Ltd., Tokyo, Japan

[21] Appl. No.: 790,556

[22] Filed: Nov. 12, 1991

[30] Foreign Application Priority Data

Nov. 19, 1990 [JP] Japan .................. 2-311493

[51] Int. Cl.$^5$ ............................................ G06F 15/18
[52] U.S. Cl. ........................................................ 395/22
[58] Field of Search ................................... 395/22, 24

[56] References Cited

U.S. PATENT DOCUMENTS

| | | | |
|---|---|---|---|
| 3,986,007 | 10/1976 | Ruoff, Jr. ................. | 395/94 |
| 4,630,219 | 12/1986 | DiGiacomo et al. ....... | 364/489 |
| 4,660,166 | 4/1987 | Hopfield ................... | 395/24 |
| 4,920,502 | 4/1990 | Yamada .................... | 395/11 |

OTHER PUBLICATIONS

Davis, G. W., "Sensitivity Analysis in Neural Net Solutions", IEEE Trans. Syst., Man and Cybernetics, Sep.-/Oct. 1989, 1078-1082.
"Current State of Study on Neural Computer, Learning from Brain and Nerve", A. Kazuyuki, Denki University Edition, 1988 pp. 98-105.
"Neural Network Information Processing", A. Hideki, Sangyo-Tosho, 1988 pp. 118-123.
"Theoretical View on Hopfield Type Neural Network", A. Shigeo, 38th National Meeting of Information Processing Society, 1989, pp. 470-471.
"Characteristics of Convergence of Hopfield Type Neural Network", A. Shigeo, National Meeting of Electric Society, 1989, pp. 12-1 and 12-2.
"BIT", vol. 22, No. 8, Kyouritu ed., 1990, pp. 920-921.
Michael Kass, et al., "Snakes: Active Contour Models", Proceedings of First International Conference on Computer Vision, IEEE Computer Society Press, 1987, pp. 259-268. (Provided in English).

*Primary Examiner*—Michael R. Fleming
*Assistant Examiner*—Robert W. Downs
*Attorney, Agent, or Firm*—Fay, Sharpe, Beall, Fagan, Minnich & McKee

[57] ABSTRACT

By using the state transition of a highly interconnected neural network, in order to solve a combination problem, an energy function is set by the following procedure: (i) the energy function is set in correspondence to the size of the combination problem; (ii) the energy function is set for a combination problem to be solved by using an energy function which solved another combination problem of a different size from the combination problem to be solved. Also, in order to solve a problem involving the cutting out a specific image from a whole image, as a combination problem when obtaining pixels representing a contour of an object, the energy function is set by either (i) or (ii) above.

8 Claims, 7 Drawing Sheets

COMBINATION PROBLEM SOLVING METHOD AND APPARATUS

CROSS-REFERENCE TO RELATED APPLICATION

The present application relates to U.S. patent application of Oct. 24, 1991, entitled "NEURAL NETWORK SYSTEM FOR DETERMINING OPTIMAL SOLUTION" by Hironari MASUI et al. and assigned to the present assignee, based on Japanese Patent Application No. 02-284236 filed Oct. 24, 1990, the contents of U.S. patent application being incorporated herein by reference.

BACKGROUND OF THE INVENTION

The present invention relates to a combination problem solving method which determines such a combination of occurrences of events as meeting a given condition and an image segmentation method which segments a specific object from an image and is required for design segmentation and so on.

Conventionally, a highly interconnected neural network has been available for solving a combination problem. Whether or not the events occur in the combination problem corresponds to whether or not the corresponding neurons fire. In other words, the occurrences of the events in the combination problem match to the firing of the corresponding neurons in the network. The better a given condition is satisfied, the smaller the value of an energy function is set. The states of the neurons are transitioned properly so that the energy value may become as small as possible. That is, by the overall network to the minimum energy state, it is possible to solve a proper combination problem. The application of the highly interconnected neural network to a Traveling-Salesman Problem results in being able to obtain a considerably proper approximate solution as discussed in AIHARA Kazuyuki: Current State of Study on Neural Computer, Learning from Brain and Neuron, Denki University Edition (1988), pages 98 to 105 (First Prior Art) and Aso Hideki: Neural Network Information Processing, Sangyo-Tosho (1988), pages 118 to 123 (Second Prior Art). In these prior arts the Traveling-Salesman Problem in N cities is considered as a combination problem wherein N×N units arranged in a square are prepared for considering each row as one city and if the j-th column unit is 1, the visiting turn of the city is j-th.

The characteristics of an energy function of a Hopfield type neural network, that is, one of the highly interconnected neural networks and the method for properly setting an energy function in a highly interconnected neural network have been discussed in Abe Shigeo: Theoretical View on Hopfield type Neural Network, 38th National Meeting of Information Processing Society (in the first-half time of 1989), pages 470–471, (Third Prior Art) and Abe Shigeo: Characteristics of Convergence of Hopfield type Neural Network, National Meeting of Electric Society, 1988, pages 12-1, 12-2, (Fourth Prior Art).

In the magazine: "bit", vol. 22, No. 8, Kyouritu ed., (1990), pages 920 to 921 (Fifth Prior Art), the disclosure states that in designing an energy function each term should be normalized for preparing for later expansion. Further, to keep a balance between the terms as much as possible even if the values of the size and cost of the problem are changed, it is proposed that the cost value is divided by its average value.

Today, research and development have been active on the system handling images which have an affluent representative capability such as a presentation system used in a show window. To make more effective use of image representation, image simulation methods such as compositing into a background image or change of an object color have been widely used in design simulation of domestic electric equipment.

To carry out such an image simulation, it is necessary to cut out a specific object from an image. The cut-out technique is called an image segmentation technique. For example, the image segmentation technique means that only a car image is separated from the overall image representing the car running in a street inside a city. The image simulation technique means that, for example, the separated car image is buried in the landscape on the outskirts of the city.

A method about the image segmentation has been proposed where the coordinates representing the contour of an object are directly input by an external input device like a mouse without using the image processing technique for cutting out the image. In this method a cursor is displayed on the screen synchronous to the movement of the mouse and a user operates the mouse to move the cursor along the contour of an object to be cut. The trace of the moving mouse matches to the contour of the object.

As to the other research associated with the image segmentation there is a system called SNAKE using a dynamic model. This system is discussed in Proceedings of First International Conference on Computer Vision (1987), IEEE Computer Society press, pp. 259 to 268 (Sixth Prior Art). The system uses a method for obtaining such a curve as minimizing an energy functional made of an external constraint force, an image force, and an internal force for obtaining a contour of an object in an image.

As to the combination problem, it is necessary to newly set an energy function each time the object problem changes, because the energy function depends on the object problem. That is, if the difference between a new combination problem and the current combination problem is just a size, the energy function also changes no matter how analogous both of the combination problems are.

In the prior art, the proper energy function for solving a combination problem is not allowed to be used for another combination problem. As such, it is necessary to set an energy function for each combination problem. The fifth prior art discusses that the energy function should be normalized, while no concrete method for normalization is discussed.

As to the image segmentation method, how to solve the problem of cutting a specific object from an image will be described with the problem being a problem for obtaining pixels corresponding to the contour of the specific object by using the state transition of the highly interconnected type neural network. Further, the prior art discussing the image segmentation method will be described as well.

The solution of the cutting problem will be realized by the following routine, for example.

At first, an image is input and displayed on screen. Next, a user points to a rough contour of an object to be cut. A band-like area (meaning an area having a given width) is created around the rough contour pointed to by the user. Then, the band-like area is normalized to be a slender rectangle and the pixel values are re-sampled from an original image for creating a band-like image. By detecting edges from the band-like image with the image processing method, the edge map is created for the band-like image. Consider a highly interconnected type neural network where the pixels of the band-like image correspond to the neurons. The state of the neural network is transitioned so that the neurons located on the contour of the band-like image serve to fire. Last, by obtaining the contour from the most appropriate state of the neural network obtained by the transition, a mask image of the object is created and then is output.

In order to transition the state of the neural network so that the neurons located on the contour serve to fire, the energy function can be set to have a small value as the fired neurons meet the below-indicated conditions. First, only one neuron exists perpendicularly to the contour (in the vertical direction of the contour). Second, those neurons are chained smoothly along the contour (in the horizontal direction of the contour). Third, those neurons reflect the pixels detected as image edges by the image processing. Fourth, the contour depicted by those neurons is near to the contour input from the outside.

The energy function E associated with the conditions is represented as follows $$E = (A/2) \sum_i \sum_{y \neq x} \sum_x V_{xi}V_{yi} + (B/2) \sum_i \left( \sum_x V_{xi} - 1 \right)^2 + \quad (1)$$

$$(C/2) \sum_i \sum_x \sum_{j=-a}^{a} d_j \cdot V_{xi}V_{x+j i+1} + V_{x+j i-1} \Big) -$$

$$D \sum_i \sum_x V_{xi}V_{xi}^0 - E \sum_i \sum_x V_{xi} + F \sum_i \sum_x l_{xi}V_{xi}$$

wherein x and y denote vertical coordinates of the band-like image, i is a horizontal coordinate of the band-like image, $V_{xi}$ is a neuron representing a pixel at the location (x,i), $V_{xi}$ has any value ranging from 0 to 1, if the pixel is considered perfectly as a part of contour, the neuron has a value of 1, and if not at all, a value of 0. $V^0{}_{xi}$ denotes an edge map having any value ranging from 0 to 1, if it matches to an edge, it has a value of 1 and if not, a value of 0, j denotes a vertically scanning index having a value ranging from $-a$ to a, dj represents a distance between neurons when the distance between th pixels on one column and the adjacent column is j. $l_{xi}$ represents the distance between the location (x,i) and the rough contour pointed from the outside, A, B, C, D, E, F are real coefficients.

The terms of the coefficients A and B offer a more advantageous energy function if only one contour pixel exists in the column (vertical) direction. Those two terms become minimum, if only one pixel located in the column direction merely has a value of 1. The term of the coefficient C offers a more advantageous energy function if the pixels depicting the contour are smoothly chained in the horizontal direction. For those pixels, the scanning is done on both of the adjacent neural columns by (2a+1) pixels. The term becomes a more advantageous energy function as the vertical distance between the adjacent neurons both having a non-zero value in each neural column becomes smaller, because the energy becomes smaller as that vertical distance becomes smaller. Hence, along the horizontal direction, the pixels having a value of 1 often have the similar vertical coordinates. The term of the coefficient D offers a more advantageous energy function as the pixels considered to be part of the contour are more reflective on the edge map. That is, if a neuron has a value of 1, the term offers a more advantageous energy function for the neuron located on the edge map than the neuron located out of the edge map. The term of the coefficient E is a term for setting how easily the neuron fires. The term of the coefficient F offers a more advantageous energy function as the pixels representing the contour is closer to the rough contour pointed from the outside. This term offers a more advantageous energy function if two or more pixels in one neural column are detected as edges of the edge map and the neuron fires at the closest pixel to the rough contour.

The actual procedure will be described below (Sigmoid Function)
$$du/dt = -u/\tau - \partial E/\partial V, \quad (2)$$
$$V = (1 + \tanh(u/u_0))/2$$

wherein u denotes an internal state of a neuron, t denotes a time, $\tau$ and $u_0$ denote constants.

In accordance with a dynamic model represented by the formula (2), the network is transited in the direction of reducing the energy, resulting in obtaining a desirous contour.

The energy function, however, depends on the subject problem. Hence, each time the subject combination problem has another size, the coefficients of the energy function are required to be changed.

SUMMARY OF THE INVENTION

It is a first object of the present invention to provide a method for solving a combination problem which is capable of setting an energy function according to a size of a combination problem in solving the combination problem using the state transition of the network.

It is a second object of the present invention to provide a method for solving a combination problem which is capable of setting an energy function for solving a combination problem to be solved by using the energy function used for solving another combination problem having a different size from the size of the combination problem to be solved.

It is a third object of the present invention to provide a method for cutting out an image which is capable of setting an energy function according to the size of a combination problem used for solving a problem of cutting out a specific object from an image, the combination problem being designed to obtain contour pixels by using the state transition of the highly interconnected neural network.

It is a fourth object of the present invention to provide a method for cutting out an image which is capable of setting an energy function for solving a combination problem by using the energy function used for solving another combination problem having a different size from that of the combination problem to be solved, when the problem of cutting out a specific object from an image is solved as the combination problem designed to obtain contour pixels using the state transit of the highly interconnected neural network.

In carrying out the first and the third objects, the method for solving a combination problem includes the steps of extracting a portion depending on the size of the combination problem from the energy function, obviating the dependency for matching the energy function to a combination problem having any size.

In carrying out the second and the fourth objects, the method for solving a combination problem includes the step of modifying the portion of the energy function depending on the size of the combination problem, for applying the energy function of a combination problem into another combination problem having a different size from the size of the combination problem.

DESCRIPTION OF THE PREFERRED EMBODIMENTS

At first, principle of the present invention will be described.

Consider the combination problem is solved by using the state transition of the highly interconnected neural network.

The following terms forming an energy function are considered.

(1) Term where a constraint of the combination problem is described as a penalty term.

For example, the following formulas (3) and (4) are considered $$(B/2) \sum_i \left( \sum_x V_{xi} - 1 \right)^2 \quad (3)$$

$$(A/2) \sum_i \sum_{y \neq x} \sum_x V_{xi} V_{yi} \quad (4)$$

wherein neurons are ranged in a two-dimensional (vertically and horizontally) rectangular manner, y and x denote vertical coordinates, i denotes a horizontal coordinate, $V_{xi}$ denotes an output value of a neuron located at (x,i), and A and B denote positive coefficients.

When just one neuron in each of neuron columns fires, the formula (3) becomes zero, that is, a minimum value. The energy never becomes zero except in this case only if V has one of the two values of 1 and 0. If, however, V has any real value ranging from 1 to 0, the energy becomes zero if any combination of neuron values results in making a sum of neurons in a column 1. The formula (4) serves to add such a term as reducing the energy to zero, that is, a minimum value when one or no neuron in each column has a non-zero value. If, therefore, V takes any real value ranging from 0 to 1, the use of both terms of the formulas (3) and (4) makes it possible to include in the conditions that just one neuron in each column fires.

(2) Term where the distance between the neurons is described.

For example, consider the following formula (5)

$$(C/2) \sum_i \sum_x \sum_{j=-a}^{a} d_j V_{xi}(V_{x+j\,i+1} + V_{x+j\,i-1}) \quad (5)$$

wherein j denotes an index for vertical scanning, $d_j$ denotes a distance between the neurons if the distance between the vertical coordinates of the neurons keeps an interval of j, and C is a positive coefficient.

The neuron columns located on both sides of the subject neuron are scanned by (2a+1) neurons. With this term, as the vertical distance between the two neurons adjacent to each other in any column becomes smaller, the energy becomes lower. Along the horizontal direction, the vertical coordinates of the neurons having a value of 1 do not sway so extremely.

In the energy function set according to the above terms (1) and (2), the coefficients A, B and C have different values respectively according to the size of the combination problem.

The magnitudes of the formulas (3) and (4) are proportional to the number of neurons ranged in one row (horizontal direction), because those formulas are conditioned to have one neuron which fires in one column.

With the formula (5), consider the distance is proportional to the number of neurons in one column. The magnitude of this term is proportional to the number of neurons in a vertical (column) direction. Herein, it is assumed that the network has one or no neurons which fire in the vertical (column) direction.

In a case where the energy function suited to a combination problem is applied to another combination problem having a different size rather than the original combination problem, considering how much the combination problem depends on the size, the following equations (6) can be established.

$$A = (N'/N)A', \ B = (N'/N)B', \ C = (M'/M)C \quad (6)$$

wherein A', B' and C' are coefficients of the term of the known energy function, M' is the number of vertically-arranged pixels of an image about the problem of the known energy function, N' is the number of horizontally-arranged pixels of an image about the problem of the known energy function, A, B and C are coefficients of the terms of an unknown energy function, M is the number of vertically-arranged pixels of an image about the problem of the unknown energy function, and N is the number of horizontally-arranged pixels of an image about the problem of the unknown energy function.

The function of the image segmentation method will be described below.

From each term of the energy function E of the formula (1), how much the combination problem depends on the size is extracted.

Herein, it is assumed that if one pixel of an image formed at low resolution is divided into more fine pixels by forming the same image at high resolution, the former one pixel for the low resolution is equivalent to the horizontally-arranged pixels in the center row of the latter fine pixels for the high resolution.

The magnitude of the term of the coefficient A or B which is proportional to the number of the pixels which fire in a column is conditioned to be one.

Assuming that the distance is an absolute value of the difference of the vertical coordinates, the magnitude of the term of the coefficient C is proportional to the number of vertically-arranged pixels. Herein, it is also assumed that the network meets the condition that the number of the pixels which fire in a column is conditioned to be one or less.

With respect to the terms of the coefficients D and E, it is necessary to take two steps for extracting the dependency. At first, consider that the state of the network is similarly magnified if the pixels are M-folded in the vertical direction and N-folded in the horizontal direction. Hence, the magnitude of the energy is proportional to $M \times N$. Next, the set of the pixels representing the M- and N-folded contour is compressed to one pixel wide only in the vertical direction at the location. The energy is reduced by a factor of M. Hence, the magnitude of the term is proportional to N, that is, the number of the pixels arranged in the horizontal direction.

With respect to the term of the coefficient F, it is necessary to take two steps for extracting the dependency. At first, consider that the state of the network is similarly magnified if the number of the pixels are M-folded in the vertical direction and N-folded in the horizontal direction. In light of the scaling factors of the distance and the number of the pixels, the energy is proportional to $M^2N$. Next, set of the pixels representing the magnified contour is compressed to one pixel wide only in the vertical direction at the location. Hence, the magnitude of the energy is reduced by a factor of M. As a result, the magnitude of the term is proportional to $M \times N$, that is, it is a product of the number of the pixels in the vertical direction and in the horizontal direction.

Considering the above-described dependency of the combination problem based on the size, the application of an energy function of a combination problem into another combination problem having a different size depends on the equations (7) indicated below $$A = (N'/N)A', B = (N'/N)B', C = (M'/M)C, \quad (7)$$
$$D = (N'/N)D', E = (N'/N)E,$$
$$F = (M'N'/(MN))F$$

wherein A', B', C', D', E' and F' are coefficients of the terms of the known energy function, M' is the number of vertically-arranged pixels about the problem of the known energy function, N' is the number of horizontally-arranged pixels about the problem of the known energy function, A, B, C, D, E and F are coefficients of terms of an unknown energy, M is the number of the vertically-arranged pixels of an image about the problem of the unknown energy function, and N is the number of the horizontally-arranged pixels of tee image about the problem of the unknown energy function.

Figure 1:
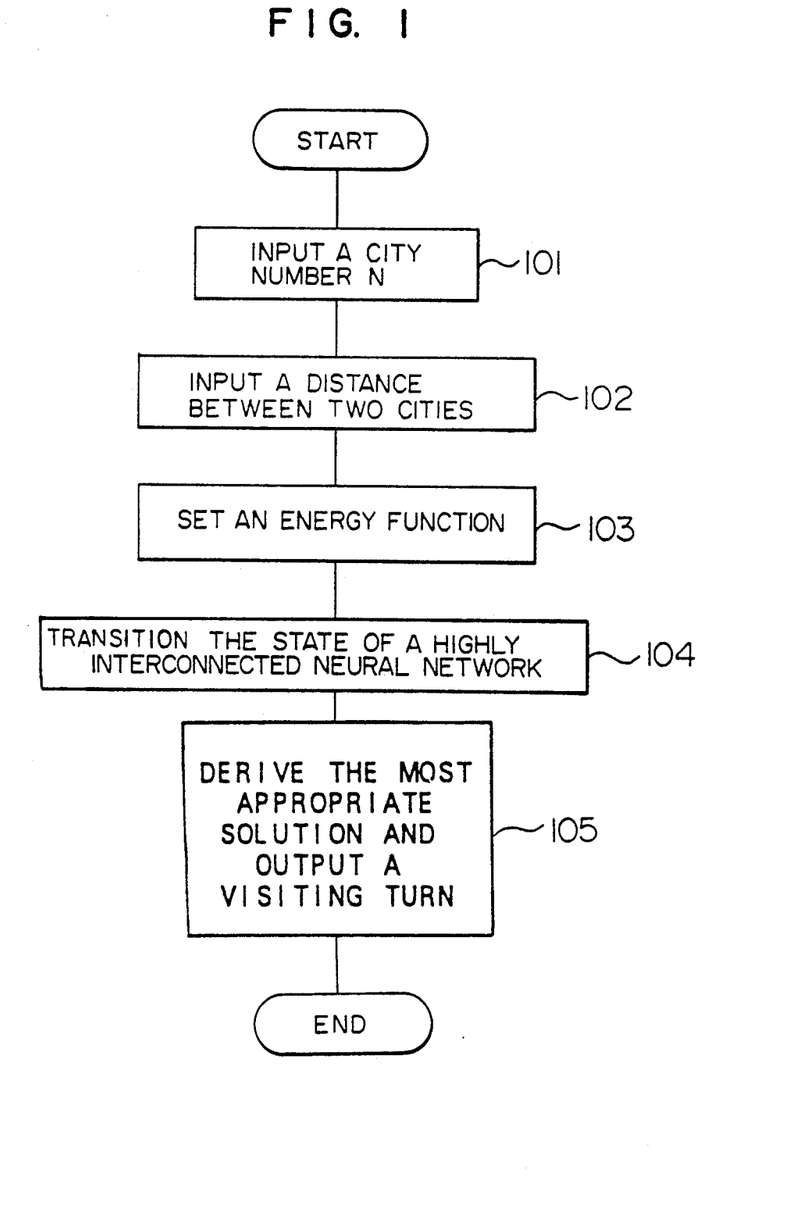
FIG. 1 is a flowchart showing the procedure executed in applying to a Traveling-Salesman Problem a combination problem solving method according to an embodiment of the present invention.
Figure 2:
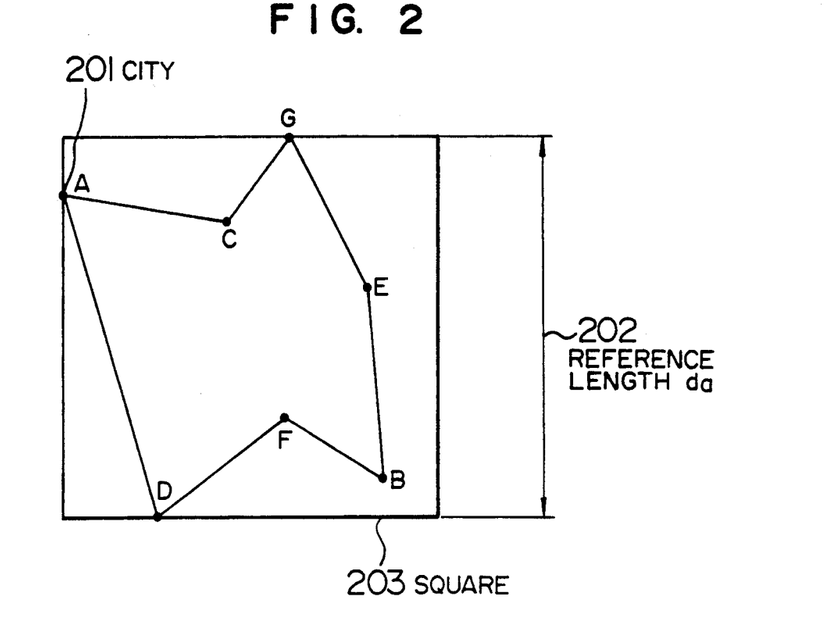
FIG. 2 is a view for describing the Traveling-Salesman Problem.
Figure 3:
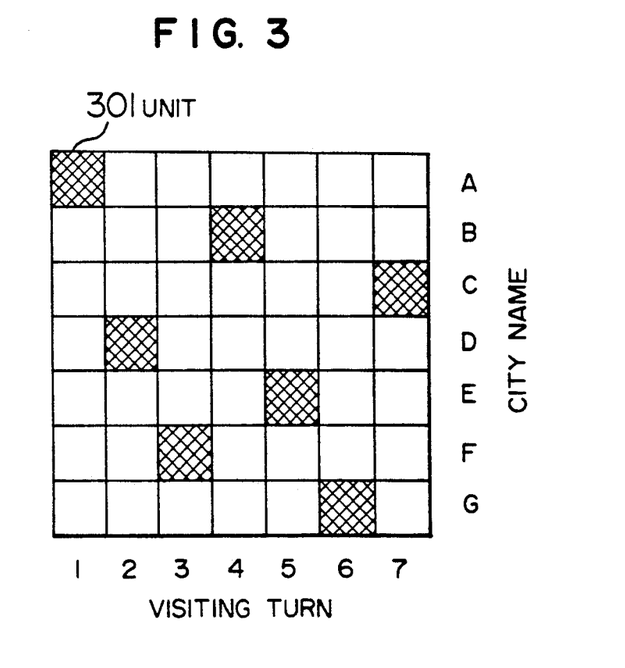
FIG. 3 is a view for describing the location of neurons in solving the Traveling-Salesman Problem.

The description will now be directed to a combination problem solving method according to an embodiment of the present invention described with reference to FIGS. 1 to 3. The Traveling-Salesman Problem is solved by using the state transition of the highly interconnected neural network. The N-city Traveling-Salesman Problem is a problem for solving for the shortest paths where one salesman travels around all the N cities 201 on the map shown in FIG. 2 and to a starting point. As shown in FIG. 3, considering that units 301 are arranged in a square form of $N \times N$ and each row corresponds to one city. If, therefore, the j-th column unit 301 on a row fires, the visiting turn of the city is j-th. Finally, as actually shown in FIG. 3, it is necessary to arrange the units 301 so that one unit 301 on each row serves to fire and one unit 301 on each column serves to fire. Further, it is possible to formulize this problem as a combinational optimizing problem which provides the shortest paths for solving the problem.

The concrete procedure will be described referring to the flowchart shown in FIG. 1. At a step 101, a number of cities N is input. At a step 102, distance between two cities of all the cities is input. At a step 103, an energy function is set for the neural network. The energy function is given as below $$E = (A/2) \sum_i \left( \sum_x V_{xi} - 1 \right)^2 + (B/2) \sum_x \left( \sum_i V_{xi} - 1 \right)^2 + \quad (8)$$

$$(C/2) \sum_i \sum_x \sum_y d_{xy} V_{xi}(V_{y\,i+1} + V_{y\,i-1})$$

wherein x, y denote cities, i denotes a visiting turn, $V_{xi}$ is a neuron representing a unit having the visiting turn i of the city x, the neuron having any value ranging from 0 to 1 and coming closer to 1 as the likelihood of the occurrence of the event is higher, dxy represents distance between the cities x and y, and A, B and C are positive coefficients.

Herein, the term of the coefficient A represents as a penalty term the constraint that just one city is visited at the i-th turn. If just one neuron on each neuron column as shown in FIG. 3 fires, the term of the coefficient A becomes 0, that is, a minimum value. The term of the coefficient B represents as a penalty term the constraint that only one neuron fires out of units representing the visiting turn of the city x. If just one neuron on each row shown in FIG. 3 fires, the term becomes 0, that is, a minimum value. The term of the coefficient C offers a more advantageous energy function if the distance of the path obtained by this network becomes shorter. If the conditions about the terms of the coefficients A and B are satisfied, the term of the coefficient C becomes a minimum value if the obtained path reaches the shortest distance.

The coefficients A, B and C of the energy function depend on the number of the cities N. Hence, with the procedure indicated in the above paragraph of the "principle", it is possible to extract the portion of the combination problem depending on the size.

The terms of the coefficients A and B are proportional to number of the cities N.

The term of the coefficient C needs the following procedure in addition to the procedure indicated in the above paragraph of the principle. In a map as shown in FIG. 2, considering a minimum area square 203 containing all the cities, the length of one side is set as a reference length da 202. It is considered that the length of one round path is proportional to a product of a root of the number of the cities N and the reference length da. Fixing the largeness of the square, by increasing the number of the cities by a factor of k², the average area per one city on the map is k/(k²) and the scale of the length is 1/k. Hence, the distance from the city to a proper next city is considered to be 1/k on average. The around path is equal to k² times the distance between the two cities. As a result, the around path is k-folded. Fixing the number of the cities, it is obvious that the magnitude of the term is proportional to the reference length da. The magnitude of this term is proportional to a product of a root of the city number N and the reference length da.

As is apparent from the above description, if the energy function for solving the Traveling-Salesman Problem is known, by defining the coefficients based on the equations (9), it is possible to solve another Traveling-Salesman Problem, having a different size such as a different number or different distances between the two cities $$A = (N'/N)A',$$
$$B = (N'/N)B',$$
$$C = (\sqrt{N'} \ da'/(\sqrt{N} \ da))C \tag{9}$$

wherein A', B' and C' are coefficients of terms of the known energy function, N' is the number of cities concerned with the problem of the known energy function, da' is a reference length about the problem of the known energy function, N is the number of cities about the problem of an unknown energy function, and da is a reference length about the problem of the unknown energy function.

At a step 104, a solution for the most appropriate path is obtained by transitioning the state of the highly interconnected neural network. According to the formula (2), the network is transitioned so that the energy function may have a smaller value. At a step 105, it is possible to output the visiting turn obtained by transitioning the highly interconnected neural network.

Next, the description will be directed to the image segmentation method according to an embodiment of the present invention with reference to FIGS. 4 to 9.

Figure 4:
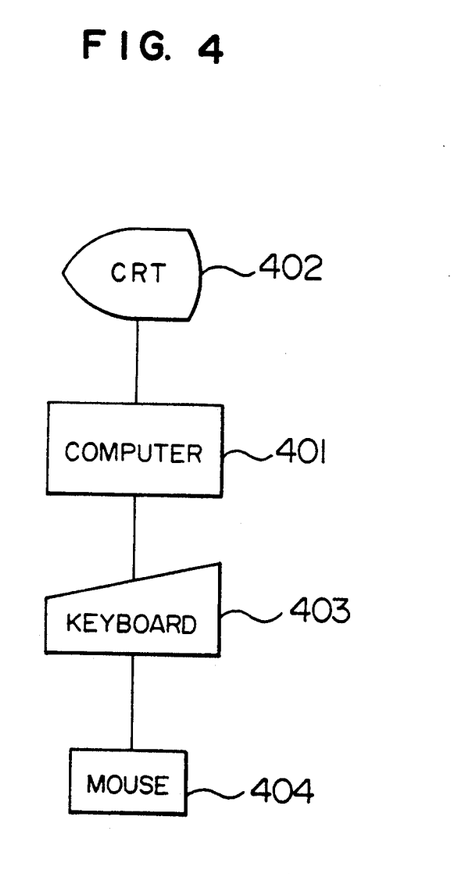
FIG. 4 is a diagram showing hardware executing an image segmentation method according to an embodiment of the present invention.
Figure 5:
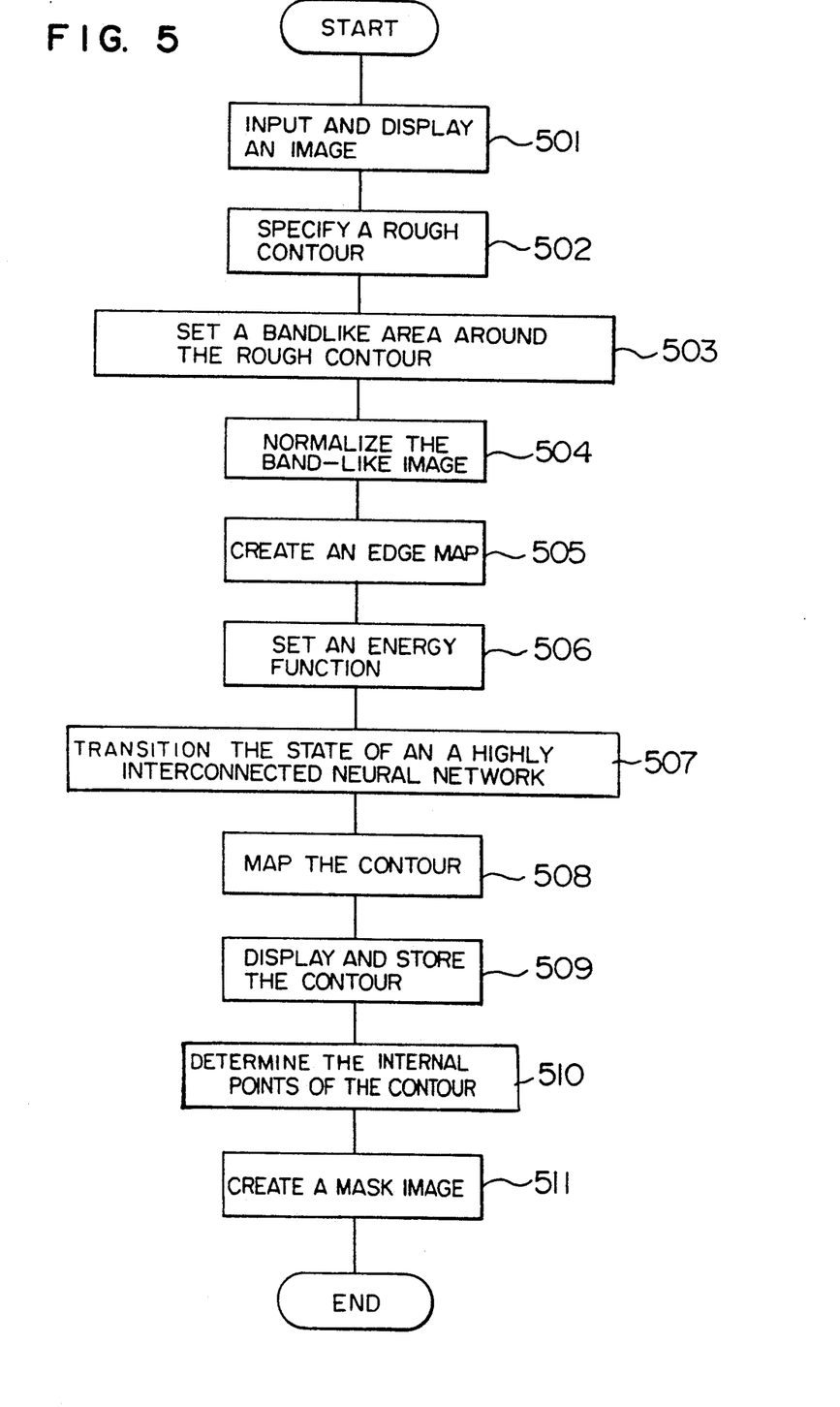
FIG. 5 is a flowchart showing the procedure executed in the embodiment shown in FIG. 4.

FIG. 4 is a diagram showing the hardware for executing the image segmentation method according to the present embodiment. FIG. 5 is a flowchart showing the procedure executed in a computer 401 shown in FIG. 4.

Figure 6A:
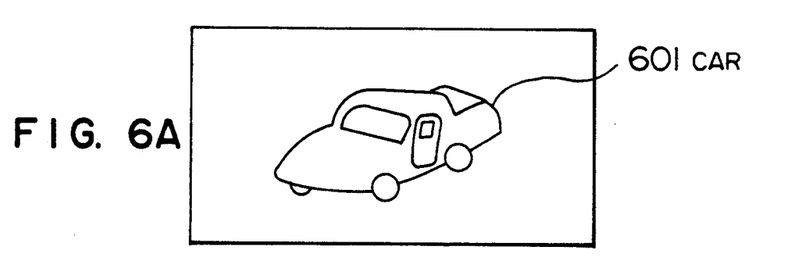
FIGS. 6A to 6C are views showing an input image, a rough contour input from the outside, and the set band-like area.
Figure 6B:
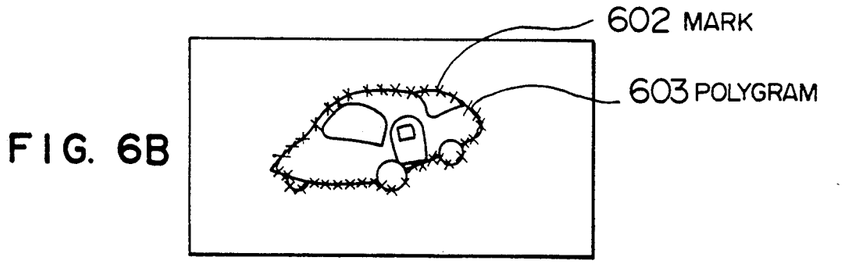
Figure 6C:
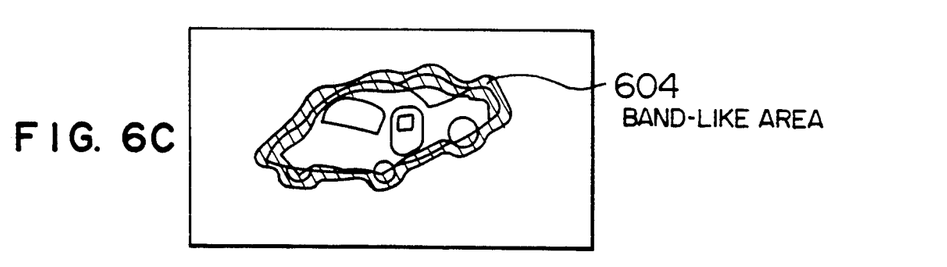
Figure 7A:
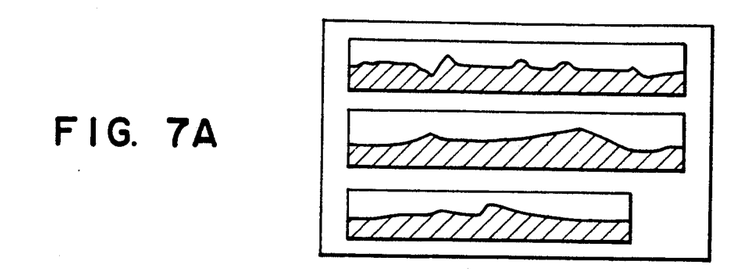
FIGS. 7A and 7B are views showing a band-like image with re-sampled pixel values and an edge map created by zero crossing in the embodiment shown in FIG. 4.
Figure 7B:
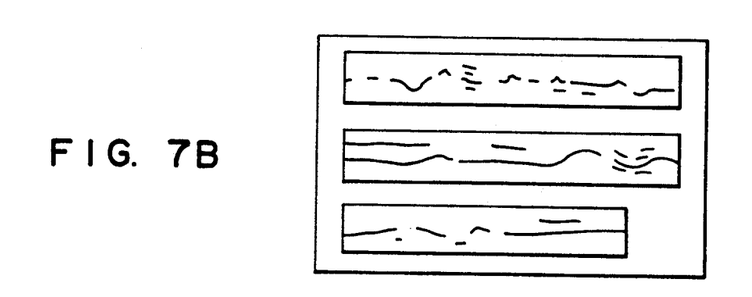
Figure 8A:
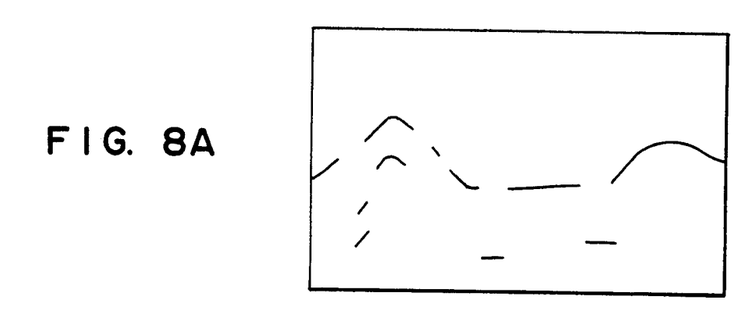
FIGS. 8A and 8B are views showing an edge map, which is the initial value given to the neural network and the final state of the transitioned neural network.
Figure 8B:
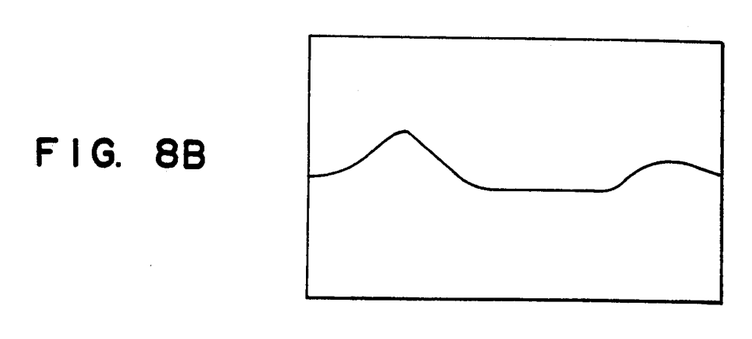

The fundamental procedure of the present invention will be described referring to FIG. 5. At a step 501, an image is input and displayed. The image is displayed on a CRT 402 shown in FIG. 4 in such a manner shown in FIG. 6A. Hereafter, as taking as an example the cutting out a car 601, the steps shown in FIG. 5 will be described. At step 502, the rough contour of the car is specified with a mouse 404. By specifying the points on the contour of the car, marks 602 are displayed as shown in FIG. 6B. The respective adjacent marks are connected by lines, resulting in obtaining a polygonal line 603. This polygonal line is called as a rough contour. At a step 503, the width of a band-like area is input from the outside with a keyboard 403. The band-like area 604 around the rough contour is created according to the value of the width and is displayed on the CRT 402. The band-like area 604 is shown in FIG. 6C. At a step 504, the band-like area 604 is normalized to a rectangular composed of two directions, that is, the tangent direction and the normal direction perpendicular to each other, for re-sampling the pixel values of the image. The image of the re-sampled pixel, which is called band-like image, is shown in FIG. 7A. At a step 505, the portions where the density difference is large are extracted from the band-like image through the effect of a zero crossing method, one of edge detecting techniques in image processing. The extracted result is called as an edge map and is displayed in FIG. 7B. At a step 506, the energy function is set according to the formulas (1) and (7). At a step 507, the pixels representing the contour are obtained by transitioning the state of the highly interconnected neural network. This operation corresponds to the transition from FIG. 8A to FIG. 8B. The procedure according to formula (2) is executed for the solution. At a step 508, the contour defined in the normalized band-like image is mapped to the coordinate system on which an original image is represented. At a step 509, the contour is displayed on the CRT 402 and stored as data in the computer 401. At a step 510, the internal pixels closed by the contour are defined. At a step 511, the image data is created. This image data includes attribute information of the internal pixels closed by the contour, that is, all the pixels representing a specific object. Then, the image data is stored in the computer 401. This image data is called a mask image.

Figure 9A:
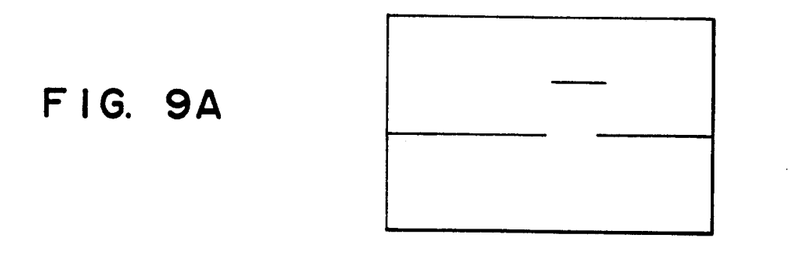
FIGS. 9A to 9C are views showing a difference of the digital images with different resolution, an original image, a digital image with a coarse resolution, and a digital image with a fine resolution, respectively.
Figure 9B:
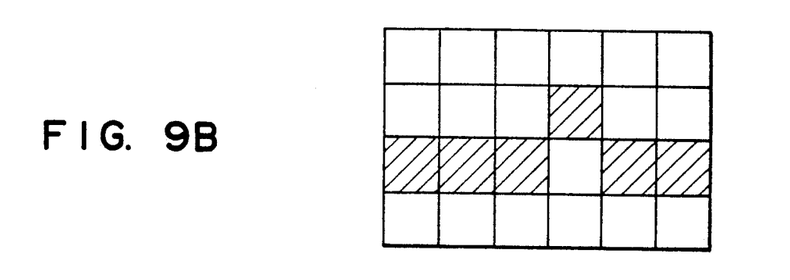
Figure 9C:
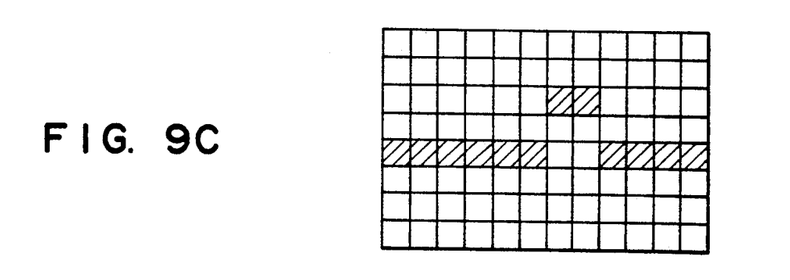

According to the present embodiment, with respect to an original image shown in FIG. 9A, it is possible to obtain a consistent solution both for coarse sampling as shown in FIG. 9B and for fine sampling as shown in FIG. 9C without being influenced by the difference of the resolutions.

The present invention provides the following advantages.

(a) According to the combination solving method of the present invention, by formalizing an energy function corresponding to the size of a combination problem, the combination solving method is capable of easily deriving an energy function for solving another combination problem having a different size from the energy function used for solving the former combination problem.

(b) According to the image segmentation method of the present invention, in a case where the problem for cutting out a specific object from an image is solved as a combination problem for obtaining the pixels representing the image contour by transitioning the state of the highly interconnected neural network, by formalizing an energy function corresponding to the size of the combination problem, the image segmentation method is capable of easily deriving an energy function used for solving another problem having a different size from the energy function used for solving the former problem.

What is claimed is:

1. A combination problem solving method for solving a plurality of characteristically similar, different sized combination problems in a highly interconnected neural network which includes a plurality of neurons interconnected to form a single layer, wherein the combination problems are solved by transitioning a state of the highly interconnected neural network, said combination problem solving method comprising:

obtaining a size of a first combination problem;

extracting from an energy function, appropriate to solve the first combination problem, a portion which is dependent upon the size of the first combination problem;

modifying the energy function by making the size of the first combination problem a portion of the modified energy function;

setting in selected neurons of the highly interconnected neural network the modified energy function appropriate to solve the first combination problem; and transitioning a state of the highly interconnected neural network formed on said single layer, in accordance with the modified energy function.

2. The method according to claim 1 wherein the modified energy function obviates the dependency for matching the energy function to a second combination problem of a size other than the size of the first combination problem.

3. A neural network system comprising:
a highly interconnected neural network including a plurality of neurons connected to form a single layer;

obtaining means for obtaining a size of a first combination problem;

extracting means for extracting from an energy function, appropriate to solve the first combination problem, a portion which is dependent upon the size of the first combination problem;

a modifying means for modifying the energy function such that the energy function is dependent upon the obtained size of the first combination problem;

setting means for setting in selected neurons of the highly interconnected neural network the modified energy function directed to solving the first combination problem; and transitioning means for transitioning a state of the highly interconnected neural network in accordance with the modified energy function of the single layer, an output state of which is repeatedly fed to an input of the single layer.

4. The neural network system according to claim 3 wherein the energy function is configured for use by the system when a second combination problem having same characteristics as the first combination problem is input into the system having a size different from the first combination problem.

5. The neural network system according to claim 3 wherein the size of the first combination problem is at least one of a number and a distance.

6. A method for solving a combination problem by transitioning a state of a highly interconnected neural network having a plurality of neurons connected to form a single layer, the method comprising the steps of:

inputting a size of a combination problem;

inputting a mutual relation among the plurality of neurons composing the neural network representing said combination problem;

modifying an energy function, used for solving an other combination problem having a different size from that of said combination problem, in accordance with a ratio of the size of said combination problem with said other combination problem;

setting in selected neurons of the plurality of neurons the modified energy function corresponding to the size of said combination problem;

transitioning a state of the neural network formed on said input mutual relation from the single layer, an output state of which is repeatedly fed to an input of the single layer;

deriving an optimal solution of said combination problem from said derived optimal state of the neural network; and outputting said optimal solution to an output of the single layer.

7. A method for solving a combination problem as claimed in claim 6, wherein said setting step is made of a process of describing said energy function in a parametric manner according to the size of the combination problem to be solved.

8. A method for solving a combination problem as claimed in claim 6, wherein said energy function is described in a parametric manner according to size of at least one of the combination problem and the other combination problem.

* * * * *